United States Patent [19]

Bryan

[11] Patent Number: 5,029,479
[45] Date of Patent: Jul. 9, 1991

[54] DIFFERENTIAL PRESSURE TRANSDUCERS

[75] Inventor: James C. Bryan, Covina, Calif.

[73] Assignee: Imo Industries, Inc., Lawrenceville, N.J.

[21] Appl. No.: 232,180

[22] Filed: Aug. 15, 1988

[51] Int. Cl.$^5$ .................................................. G01L 9/06
[52] U.S. Cl. ........................................ 73/721; 73/182; 73/720; 338/4; 338/42
[58] Field of Search .................. 73/717, 718, 719, 720, 73/721, 722, 182, 183, 861.65, 861.66, 861.67; 338/4, 42

[56] References Cited

U.S. PATENT DOCUMENTS

| | | | |
|---|---|---|---|
| 4,287,501 | 9/1981 | Tominaga et al. | 73/720 |
| 4,625,560 | 12/1986 | Sanders | 73/718 |
| 4,668,102 | 5/1987 | Mott | 73/861.65 |
| 4,773,269 | 9/1988 | Knecht et al. | 73/721 |
| 4,790,192 | 12/1988 | Knecht et al. | 73/721 |
| 4,841,776 | 1/1989 | Kawachi et al. | 73/717 |
| 4,909,083 | 3/1990 | Fazeli et al. | 73/721 |

*Primary Examiner*—Donald O. Woodiel
*Attorney, Agent, or Firm*—Benoit Law Corporation

[57] ABSTRACT

A differential pressure transducer has a first pressure chamber, defined by a first chip having a reduced-thickness first pressure-sensitive diaphragm on one side of that pressure chamber, and a second chip having a reduced-thickness second pressure-sensitive diaphragm on another side of that pressure chamber. A first pressure port communicates with that first diaphragm on a side opposite the first pressure chamber and a second pressure port is coupled to the first pressure chamber. A second pressure chamber is on a side of the second diaphragm opposite the first pressure chamber. Sensors are at the first diaphragm for measuring differential pressure between said first and second ports and at the second diaphragm for measuring differential pressure between said first and second pressure chambers. An aperture may extend through one of the chips in a region spaced from its pressure-sensitive diaphragm, which may therethrough be coupled to the second pressure port. That feature may also be part of a subcombination in which one of the chips or diaphragms is omitted.

29 Claims, 5 Drawing Sheets

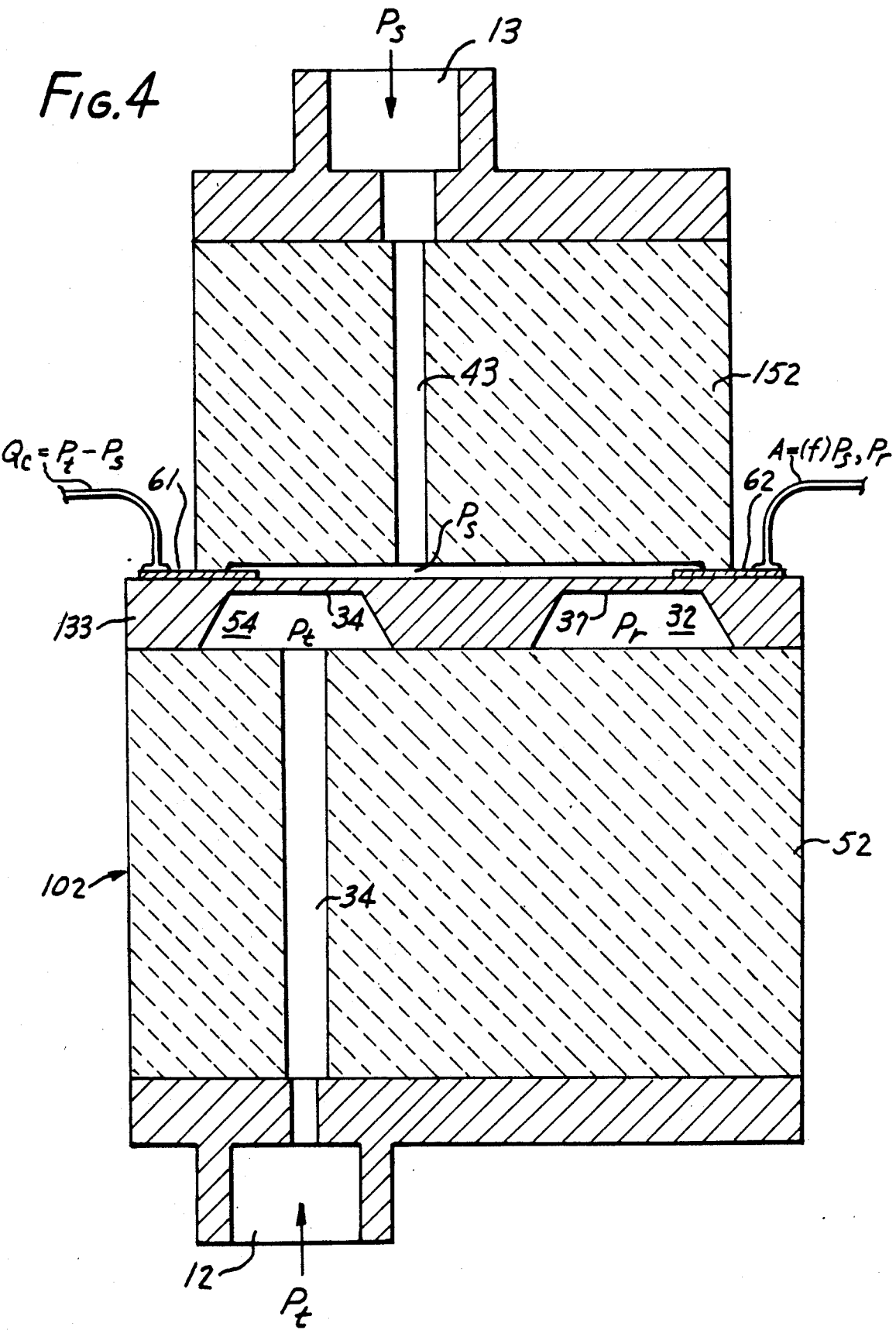

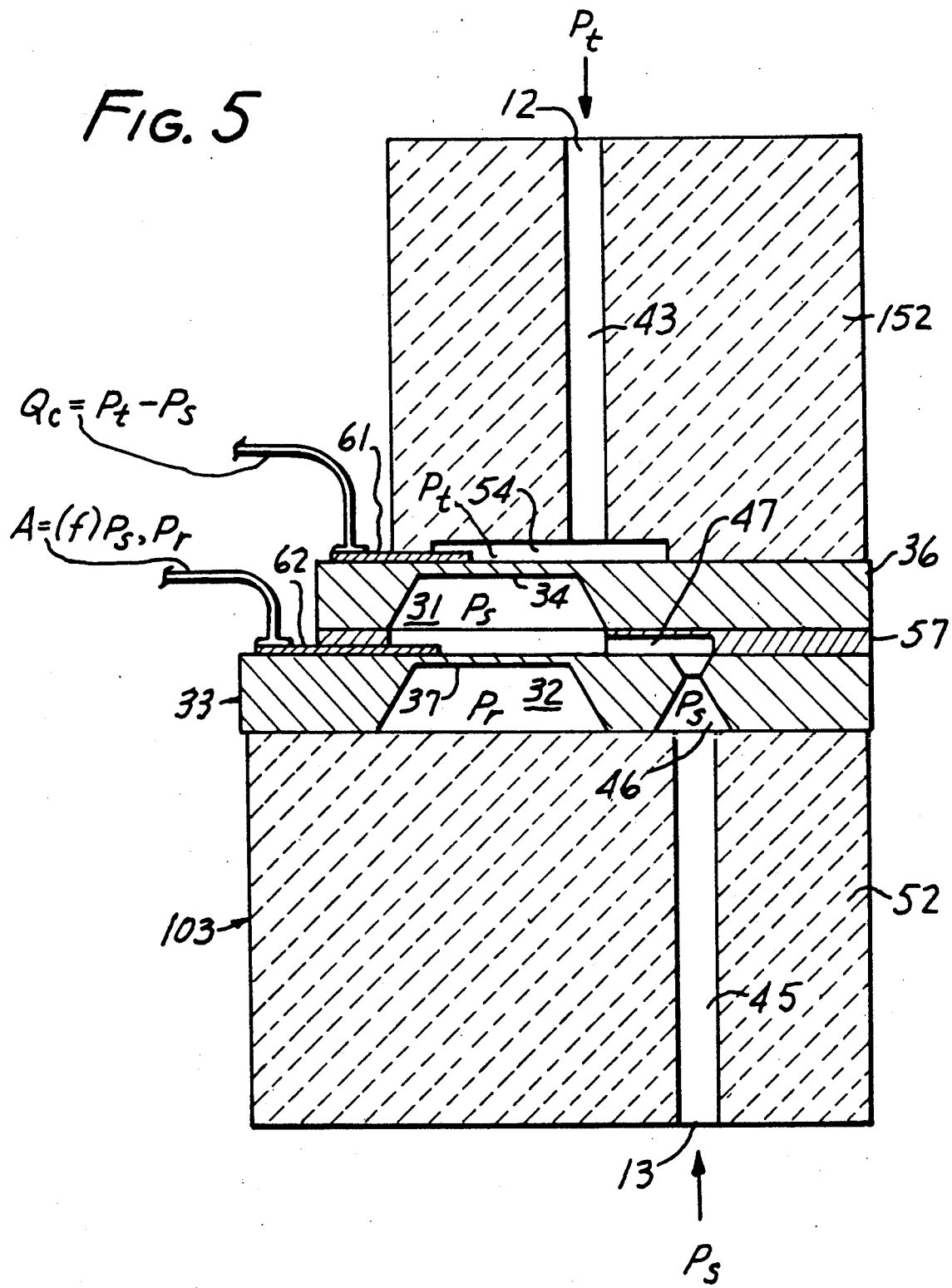

DIFFERENTIAL PRESSURE TRANSDUCERS

BACKGROUND OF THE INVENTION

1. Field of the Invention

The subject invention relates to strain gage and other differential pressure transducers, including avionic and other differential pressure transducers responsive to two or more different pressures or pressure signals.

2. Information Disclosure Statement

Conventional differential pressure transducers are responsive to two pressure signals or to one pressure signal relative to a reference pressure. In the past, two conventional pressure transducers have been interconnected to provide a combination responsive to two pressure signals and a reference pressure, for instance. More specifically, this has been done in avionic instrumentation for sensing altitude and airspeed relative to a reference pressure.

There is a need in avionics and elsewhere for an integrated differential pressure transducer responsive to three pressure signals or to two pressure signals and a reference pressure. In avionics, and also in other fields, the need is particularly strong for a integrated differential pressure transducer which is smaller, lighter and more accurate than the above mentioned combination of pressure transducers.

Such a need even exists with respect to pressure transducers that are only handling two different pressure signals.

SUMMARY OF THE INVENTION

It is a general object this invention to overcome the disadvantages and to the needs expressed or implicit in the above Information D Statement or in other parts hereof.

It is a germane object of the invention to provide integrated differential pressure transducers responsive simultaneously to two or more different pressure signals or to two pressure signals and a reference pressure.

It is a related object of this invention to reduce the size, weight and/or to increase the accuracy of differential pressure transducers.

Other objects of the invention will become apparent in the further course of this disclosure.

From one aspect thereof, the subject invention resides in a differential pressure transducer, comprising, in combination, means providing first, second and third pressure chambers including a reduced-thickness first pressure sensitive diaphragm for the second pressure chamber, and a reduced-thickness second pressure-sensitive diaphragm for the third pressure chamber, with the first and second diaphragms being located between the first pressure chamber and the second and third pressure chambers, respectively, a first pressure port communicating with one of the second and third pressure chambers, a second pressure port communicating with the first pressure chamber, first sensing means at the first diaphragm for measuring differential pressure between the first and second ports, and second sensing means at the second diaphragm for measuring differential pressure between the first pressure chamber and the other of the second and third pressure chambers.

From another aspect thereof, the invention resides in a differential pressure transducer, comprising, in combination, a chip having a reduced-thickness pressure-sensitive diaphragm in a central region thereof, a first pressure port communicating with that diaphragm on one side of that chip, an aperture extending through the chip in a region spaced from the pressure-sensitive diaphragm, a second pressure port, means for coupling the diaphragm on a side of the chip opposite the above mentioned one side through the above mentioned aperture to the second pressure port including a channel in the chip between the aperture, which extends through the chip, and the diaphragm at the latter opposite side, and sensing means at the diaphragm for measuring differential pressure between the first and second ports.

From another aspect thereof, the subject invention resides in a differential pressure transducer, comprising, in combination, means providing a first pressure chamber, including a first chip having a reduced-thickness first chamber, and a second chip having a reduced-thickness second pressure-sensitive diaphragm on another side of that pressure chamber, a first pressure port communicating with the first diaphragm on a side opposite the first pressure chamber, a second pressure port coupled to the first pressure chamber, means for providing a second pressure chamber on a side of the second diaphragm opposite the first pressure chamber, first sensing means at the first diaphragm for measuring differential pressure between the first and second ports, and second sensing means at the second diaphragm for measuring differential pressure between the first and second pressure chambers.

From a related aspect thereof, the subject invention resides in a differential pressure measurement method using first and second pressure-sensitive diaphragms with first and second sensing means for measuring differentials between first and second pressures and differentials between that first and a third pressure, different from those first and second pressures. The invention according to this aspect resides, more specifically in the improvement comprising, in combination, the steps of providing a pressure chamber with the aid of the first and second diaphragms, applying the first pressures to the pressure chamber, and applying the second and third pressures to the first and second pressure-sensitive diaphragms, respectively, outside of that pressure chamber.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIGS. 3, 4 and 5 are views similar to FIG. 1 of differential pressure transducers according to further embodiments of the subject invention.

DESCRIPTION OF PREFERRED EMBODIMENTS

Figure 1:
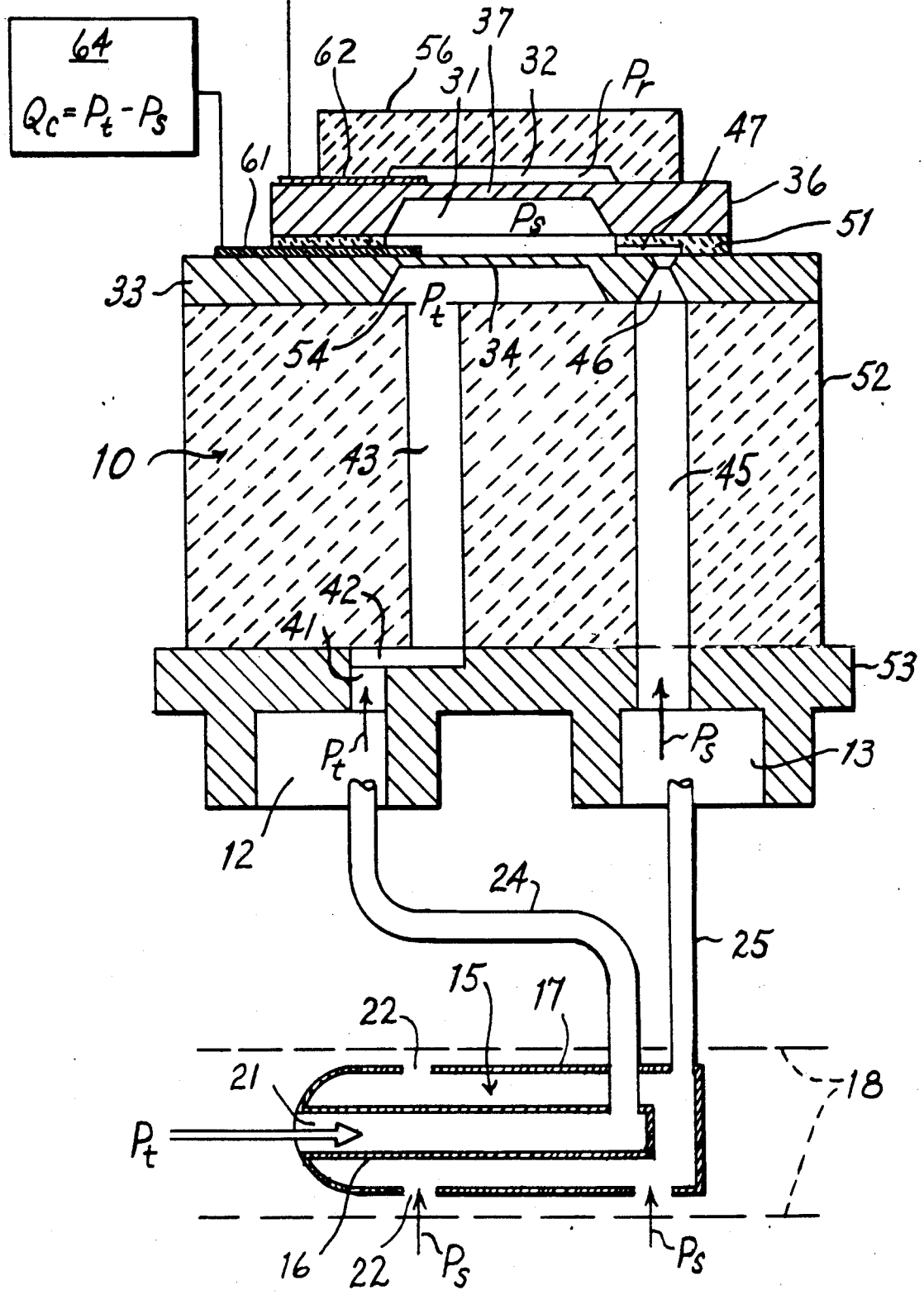
FIG. 1 is a section through a differential pressure transducer according to a preferred embodiment of the invention and of a pitot-static tube arrangement in combination therewith.

FIG. 1 shows a differential pressure transducer in the form of an integrated structure 10 for measuring or responding to three pressures, such as two pressure signals and a reference pressure.

By way of example, FIG. 1 shows a reference pressure $P_r$, an ambient pressure $P_s$, a-d a total pressure $P_t$. In this respect, the structure 10 can be employed differentially to respond to such three pressures or pressure signals.

By way of further example, altitude and airspeed in avionics can be functions of $P_s$ - $P_r$ and $P_t$ - $P_s$, respectively. The structure 10 according to the subject invention effects a sensing of $P_s$ at the same time, place and temperature for both altitude and airspeed functions, thus enhancing accuracy.

Other applications and areas of utility will become apparent to those skilled in the art from the subject disclosure, whenever two liquid, gas or fluid pressure signals are to be compared or differentiated to each other and to a reference pressure or third pressure signal. In this respect and in general, the reference pressure may, for instance, be a vacuum.

In this respect, or by way of further example, the pressure port 12 of the differential transducer structure 10 may receive a dynamic pressure signal, while its port 13 receives a static pressure.

Even though the utility of the structure 10 is not limited in that respect, the lower part of FIG. 1 shows a pitot-static tube 15 consisting of a combination of a pitot tube 16 and a static tube 17 for measuring pressure in such a way that the relative speed of a fluid can be determined. By way of example, airspeed may be determined that way, such as aboard an aircraft or similar structure, very diagramatically indicated at 18. FIG. 1 indicates how dynamic or total pressure $P_t$ and ambient or static pressure $P_s$ are received through ports 21 and 22, respectively.

Pipes or conduits 24 and 25 conduct the pressure signals $P_t$ and $P_s$ to the ports 12 and 13, respectively, of the differential transducer structure 10. In reality, that structure 10, while shown on an enlarged scale, is much smaller than the pitot tube arrangement 15.

The structure 10 provides first and second pressure chambers 31 and 32. The means providing the first pressure chamber 31 include a first semiconductor chip 33 having a reduced-thickness first pressure-sensitive diaphragm 34 on one side of the pressure chamber 31, and a second semiconductor chip 36 having a reduced-thickness second pressure-sensitive diaphragm 37 on another side of that pressure chamber 31. In FIG. 1 the first and second pressure-sensitive diaphragms 34 and 37 extend at opposite sides of the first pressure chamber 31.

The first pressure port 12 communicates with the first diaphragm 34 on a side opposite the first pressure chamber 31. A series of channels 41, 42 and 43 or a single channel may be provided for that purpose.

The second pressure port 13 is coupled to the first pressure chamber 31, such as via a series of channels 45, 46 and 47. According to the illustrated preferred embodiment of the invention, the channel 46 includes or is an aperture in the first semiconductor chip 33 extending to the first pressure chamber 31 through that first semiconductor chip 33 in a region spaced from the first pressure-sensitive diaphragm 34.

The first and second ports 12 and 13 are on the same side of the chip 33.

The means for coupling the first pressure chamber 31 through that aperture 46 to the second pressure port 13 include a spacer or washer 51 and a body 52 having the first semiconductor chip 33 arranged therebetween. The transducer body 52 is mounted on a header 53 which defines the first and second ports 12 and 13 and the channels 41, 42 and 45. The transducer body or main spacer 52 includes the pressure signal channels 43 and 45 and supports the pressure-sensitive diaphragm structure.

In particular, the first semiconductor chip 33 is mounted on the main spacer 52, with a pressure chamber 54 at the first pressure-sensitive diaphragm 34 coinciding with the first port channel 43, and with the first chip aperture 46 registering with the second port channel 45. While FIG. 1 shows a certain relative height for the transducer body 52, the function thereof may in practice be performed by a relatively thin layer or stratum between the first semiconductor chip 33 and pressure port header 53, depending on required dielectric strength and other desired or necessary parameters, such as needed for stress isolation.

Figure 2:
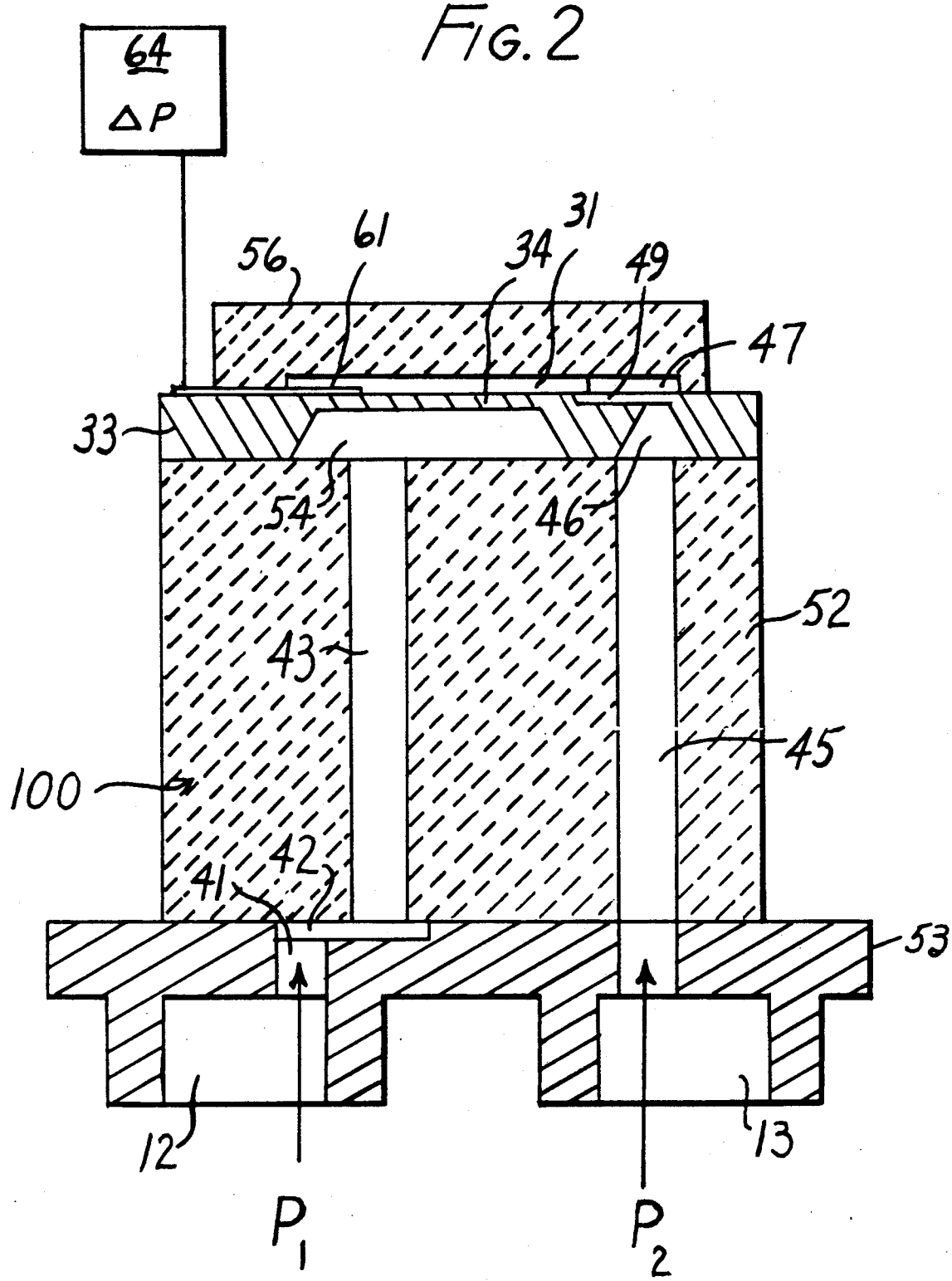
FIG. 2 is a view similar to FIG. 1 of a differential pressure transducer according to a further embodiment of the invention or subcombination of FIG. 1.

The upper spacer or washer 51 is carried on the first semiconductor chip 33 and, in turn, carries the second semiconductor chip 36, defining the first pressure chamber 31. The second port connecting channel 47 may be etched or otherwise provided as a radial slot in the washer 51. Additionally or alternatively, as illustrated in FIG. 2, a or the channel 49 between the chip aperture 46 and the diaphragm 34 on the chip 33 or the pressure chamber 31 at that diaphragm may be provided in the chip 33 itself.

A lid or stop 56 provides the second or reference pressure chamber 32 in conjunction with the second semiconductor chip 36. In the illustrated embodiments, the lid or stop 56 is carried by one of the chips 33 or 36.

The washers or spacers 51 and 52 and the lid or stop 56 may be made of pyrex, silicon nitride or of another dielectric or electrically insulating material. Silicon or other semiconductor chips and diaphragms may be used or provided at 33, 34, 36 and 37. The reference pressure or vacuum $P_r$ may be provided at the factory where the lid 56 is sealed to the second semiconductor chip 36.

The header 53 may be made of metal or the supporting body 52 and header 53 could be made of one piece.

Subcombinations of the structure 10 of FIG. 1 or of the preferred embodiment of the subject invention in general advantageously may be employed in various differential transducer structures. In this respect, FIG. 2 shows a differential transducer structure 100 composed of similar or identical parts already shown in FIG. 1. For a description of those parts, reference should be had to the above description of that FIG. 1.

In terms of combination, the differential pressure transducer 100 shown in FIG. 2 comprises a semiconductor chip 33 having a reduced-thickness pressure-sensitive diaphragm 34 in a central region thereof, a first pressure port 12 communicating with that diaphragm on one side of the semiconductor chip, an aperture 46 extending through that semiconductor chip in a region spaced from the pressure-sensitive diaphragm 34, a second pressure port 13 and means 52 including channel 45 for coupling the diaphragm 34 through the aperture 46 to the second pressure port 13.

By way of example in FIG. 2, the channel 47 between the semiconductor chip aperture 46 and the pressure chamber 31 is provided in the lid or stop 56, rather than in a washer or spacer 51 as in FIG. 1.

Even in FIG. 1, the channel 47 or an equivalent thereof between the aperture 46 and first pressure chamber 31 may be etched or otherwise provided in either one or both of the first and second semiconductor chips 33 and 36, as shown at 49 for FIG. 2 and described above. The washer or spacer 51 may then be eliminated, if that does not interfere with the operation of the differential pressure transducer. For instance, the first and second semiconductor chips 33 and 36 may be bonded together with the aid of conventional coatings that in effect take the place of a distinct intervening insulating spacer 51.

The chips 33 and 36 can be made of, or may include, silicon, polysilicon, gallium arsenide, germanium or another semiconductor material. The expression "chip" as herein employed is, however, intended to be sufficiently broad to extend to sapphire and metal for the chips 33 and 36 or diaphragms 34 and 37.

Requisite sensors, including those seen at 61 and 62, may be of a semiconductive or thin film type. Diffused semiconductor strain gages are presently preferred.

The pressures or pressure signals $P_t$ and $P_s$ may also in FIG. 2 be applied to the first and second pressure ports 12 and 13. However, FIG. 2 more generally shows pressures or pressure signals $P_1$ and $P_2$ applied to the first and second pressure ports 12 and 13 and thereby to the first and second pressure chambers 31 and 54, respectively, for differential deflection or stressing of the diaphragm 34 and for measurement or display of the pressure differential, $\Delta p$.

In FIG. 2, only one sensor 61 is shown, while FIG. 1 shows that sensor 61 also for the chip 33 and another sensor 62 for the second chip 36. In practice, such sensing means 61 and 62 may include one or more sensing elements which may be arranged in a conventional manner over the chips and diaphragms and connected in a bridge circuit as symbolically shown at 64 and 65.

In the embodiment shown in FIG. 1 the airspeed function, $Q_c$, as the differential of $P_t$ and $P_s$, may be displayed as shown at 64, while the altitude function, A, may be displayed as shown at 65 as a function of the $P_s$ and $P_r$ differential.

Another application of the embodiment of FIG. 1 is measurement of air pressure or similar parameters at a blower or fan installation, where pressure ahead of the fan could be applied to the port 12, pressure after the fan to the port 13, and ambient pressure to the second chamber 32.

However, no pressure signal need actually be applied to the second pressure chamber 32 which, as already disclosed above, may be a reference pressure chamber, and may actually be evacuated, for instance.

Figure 3:
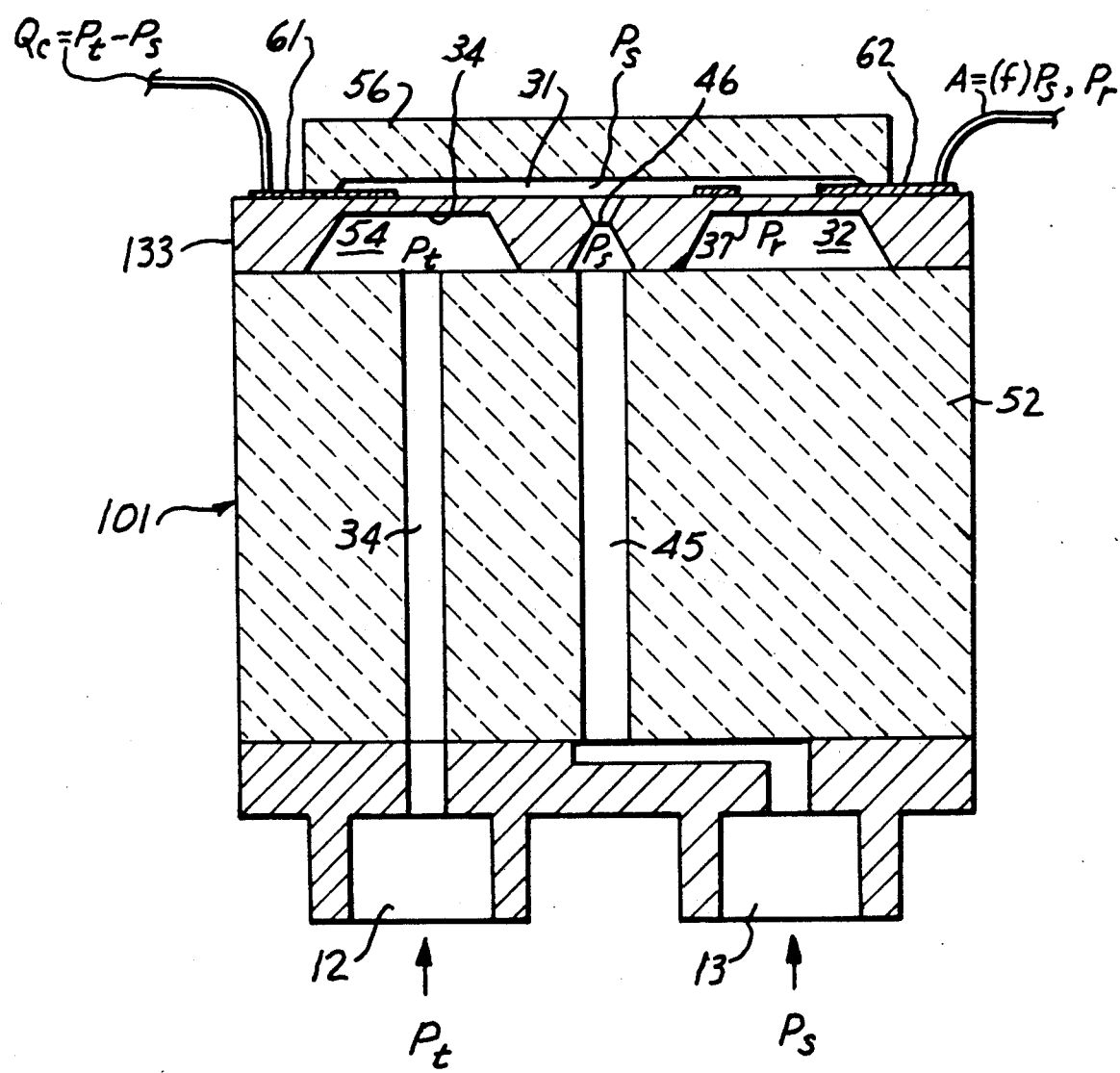

The embodiment of FIG. 1 is a species of a generic concept. Further species of the genus are shown in FIGS. 3, 4 and 5, which illustrate differential pressure transducers 101, 102 and 103 according to further embodiments of the subject invention, which will now be described in conjunction with the pressure transducer 10 of FIG. 1.

In particular, embodiments of FIGS. 1, 3, 4 and 5 provide and use first, second and third pressure chambers 31, 32 and 54 including a reduced-thickness first pressure-sensitive diaphragm 34 for the second pressure chamber, and a reduced-thickenss second pressure-sensitive diaphragm 37 for the third pressure chamber. These first and second diaphragms are located between the first pressure chamber 31 and the second and third pressure chambers, respectively.

A first pressure port 12 communicates with one of the second and third pressure chambers, and a second pressure port 13 communicates with the first pressure chamber 31. First sensing means 61 are at the first diaphragm 34 for measuring differential pressure between the first and second ports. Second sensing means 62 are at the second diaphragm 37 for measuring pressure between the first pressure chamber 31 and the other of the second and third pressure chambers. By way of example, FIGS. 1, 3, 4 and 5 show the first port 12 as communicating with the second pressure chamber 54, and the second sensing means 62 at the second diaphragm 37 for measuring differential pressure between the first pressure chamber 31 and the third pressure chamber 32.

The expressions "second" and "third" are herein used interchangeably, depending on context.

The differential pressure measurement method illustrated with the aid of FIGS. 1, 3, 4 and 5 uses first and second pressure-sensitive diaphragms 34 and 37 with first and second sensing means 61 and 62 for measuring differentials between first and second pressures and differentials between that first pressure and a third pressure, different from those first and second pressures. That method according to the invention provides a pressure chamber 31 with the aid of the first and second diaphragms 34 and 37, and applies the first pressure, such as $P_s$, to the pressure chamber 31. That method according to the invention also applies the second and third pressures, such as $P_t$ and $P_r$, to the first and second pressure-sensitive diaphragms 34 and 37, respectively, outside of the pressure chamber 31.

The different embodiments shown in FIGS. 1, 3, 4 and 5 differ in their implementation or execution of the generic method or concept, in terms of optimum adaptation to spatial and other requirements or desiderata.

By way of example, the species of FIGS. 1 and 3 are best, if locating the ports 12 and 13 on the same side of the particular apparatus or diaphragm is the best solution. Conversely, the embodiments of FIGS. 4 and 5 are advantageous if pressure conduits come from different sides to the transducer.

The embodiments of FIGS. 1 and 5 minimize transverse space requirements, since they distribute the pressure chambers along the differential transducers in a longitudinal or axial direction.

On the other hand, the embodiments of FIGS. 3 and 4 achieve implementation and operation with only a single diaphragm 133, by distributing two of the pressure chambers transversely or radially of the differential pressure transducer 101 or 102.

By way of example, the embodiments of FIGS. 3 and 4 provide the first and second diaphragms 34 and 37 in one chip 133, and provide the pressure chamber 31 on one side of that chip spanning these first and second diaphragms. Second and third pressure chambers 54 and 32 are provided at the first and second diaphragms for the second and third pressures, respectively. Specifically, the first pressure chamber 31 is on one side of the chip 133, while the second and third pressure chambers are on the opposite side of that chip, in the embodiment of FIGS. 3 and 4.

Moreover, in the embodiment of FIG. 3, the aperture 46 extends through the chip 133 in a region spaced from the pressure-sensitive diaphragms 34 and 37, for coupling the first pressure chamber 31 to the second pressure port 13, as in FIG. 1.

FIG. 4 has the advantage of dispensing with the need for aperture 46, and provides a solid diaphragm 133, depressed only for the diaphragms 34 and 37, which is particularly advantageous when the pressure lines come, or can be arranged as coming, from different sides to the pressure transducer 102. In that case, as well as in the case of the embodiment of FIG. 5, there is an additional spacer 152, duplicating the previously described spacer 52 on the other side of the diaphragm or chip region.

The embodiment of FIG. 5 shares with the embodiment of FIG. 1 the feature of providing the first and second diaphrams 34 and 37 in first and second chips 33 and 36, respectively, and providing the pressure chamber between these first and second diaphrams with the aid of those first and second chips. Second and third pressure chambers 54 and 32 are provided for the second and third pressures, respectively, outside of the second and third diaphragms 34 and 37. In other respects, the embodiment of FIG. 5 may be the same as the embodiment of FIG. 1 described above, or may be similar thereto within the scope of the subject invention.

In the illustrated embodiments of FIGS. 4 and 5, the first and second pressure ports 12 and 13 are on opposite sides of the chips 33 and 36 or of the chip 133.

The subject extensive disclosure will render apparent or suggest to those skilled in the art various other modifications and variations within the spirit and scope of the invention and equivalents thereof.

We claim:

1. A differential pressure transducer, comprising in combination:
   a chip having a reduced-thickness pressure-sensitive diaphragm in a central region thereof;
   a first pressure port communicating with said diaphragm on one side of said chip;
   an aperture extending through said chip in a region spaced from said pressure-sensitive diaphragm;
   a second pressure port;
   means for coupling said diaphragm on a side of said chip opposite said one side through said aperture to said second pressure port, including a channel in said chip between said aperture, which extends through said chip, and said diaphragm at said opposite side; and
   sensing means at said diaphragm for measuring differential pressure between said first and second ports.

2. A transducer as claimed in claim 1, wherein:
said sensing means are of a semiconductor type.

3. A transducer as claimed in claim 1, wherein:
said chip is of a semiconductor type.

4. A transducer as claimed in claim 1, including:
a lid defining along said channel a complementary channel between said aperture and said diaphragm at said opposite side.

5. A differential pressure transducer, comprising in combination:
   means providing a first pressure chamber, including a first chip having a reduced-thickness first pressure-sensitive diaphragm on one side of said pressure chamber, and a second chip having a reduced-thickness second pressure-sensitive diaphragm on another side of said pressure chamber;
   a first pressure port communicating with said first diaphragm on a side opposite said first pressure chamber;
   a second pressure port coupled to said first pressure chamber;
   means for providing a second pressure chamber on a side of said second diaphragm opposite said first pressure chamber;
   first sensing means at said first diaphragm for measuring differential pressure between said first and second ports; and
   second sensing means at said second diaphragm for measuring differential pressure between said first and second pressure chambers.

6. A transducer as claimed in claim 5, wherein:
said first and second pressure ports are on the same side of said first chip.

7. A transducer as claimed in claim 5, wherein:
said first and second pressure-sensitive diaphragms extend at opposite sides of said first pressure chamber.

8. A transducer as claimed in claim 5, wherein:
said means for providing the second pressure chamber include a lid on the second chip.

9. A transducer as claimed in claim 5, wherein:
said first and second sensing means are of a semiconductor type.

10. A transducer as claimed in claim 5, wherein:
said first and second chips are of a semiconductor type.

11. A transducer as claimed in claim 5, including:
a pitot-static tube combination having a pitot tube connected to said first pressure port and a static tube connected to said second pressure port.

12. A differential pressure transducer, comprising in combination:
   means providing a first pressure chamber, including a first chip having a reduced-thickness first pressure-sensitive diaphragm on one side of said pressure chamber, and a second chip having a reduced-thickness second pressure-sensitive diaphragm on another side of said pressure chamber;
   an aperture in said first chip extending to said first pressure chamber through said first chip in a region spaced from said first pressure-sensitive diaphragm;
   a first pressure port communicating with said first diaphragm on a side opposite said first pressure chamber;
   a second pressure port;
   means for coupling said first pressure chamber through said aperture to said second pressure port;
   means for providing a second pressure chamber on a side of said second diaphragm opposite said first pressure chamber;
   first sensing means at said first diaphragm for measuring differential pressure between said first and second ports; and
   second sensing means at said second diaphragm for measuring differential pressure between said first and second pressure chambers.

13. A transducer as claimed in claim 12, including:
means providing a channel between said aperture and said first pressure chamber.

14. A transducer as claimed in claim 13, wherein:
said means providing said channel are located on said chip.

15. A transducer as claimed in claim 12, including:
a channel in one of said chips between said aperture and said first pressure channel.

16. A transducer as claimed in claim 12, wherein:
said first and second sensing means are of a semiconductor type.

17. A transducer as claimed in claim 12, wherein:
said first and second chips are of a semiconductor type.

18. A transducer as claimed in claim 12, including:
a pitot-static tube combination having a pitot tube connected to said first pressure port and a static tube connected to said second pressure port.

19. A differential pressure transducer comprising in combination:
means providing first, second and third pressure chambers including a reduced-thickness first pressure sensitive diaphragm for said second pressure chamber, and a reduced-thickness second pressure-sensitive diaphragm for said third pressure chamber, with said first and second diaphragms being located between said first pressure chamber and said second and third pressure chambers, respectively;
said first and second diaphragms are in one chip;
a first pressure port communicating with one of said second and third pressure chambers;
a second pressure port communicating with said first pressure chamber;
first sensing means at said first diaphragm for measuring differential pressure between said first and second ports; and
second sensing means at said second diaphragm for measuring differential pressure between said first pressure chamber and the other of said second and third pressure chambers.

20. A transducer as claimed in claim 19, wherein:
said first pressure chamber is on one side of said chip; and
said second and third pressure chambers are on an opposite side of said chip.

21. A transducer as claimed in claim 20, including:
an aperture extending through said chip in a region spaced from said pressure-sensitive diaphragms for coupling said first pressure chamber to said second pressure port.

22. A transducer as claimed in claim 20, wherein:
said first and second pressure ports are on opposite sides of said chip.

23. A transducer as claimed in claim 19, including:
a pitot-static tube combination having a pitot tube connected to said first pressure port and a static tube connected to said second pressure port.

24. A differential pressure transducer comprising in combination:
means providing first, second and third pressure chambers including a reduced-thickness first pressure sensitive diaphragm for said second pressure chamber, and a reduced-thickness second pressure-sensitive diaphragm for said third pressure chamber, with said first and second diaphragms being located between said first pressure chamber and said second and third pressure chambers, respectively;
said first and second pressure-sensitive diaphragms are in first and second chips, respectively, extending at opposite sides of said first pressure chamber;
a first pressure port communicating with said first pressure chamber;
first sensing means at said first diaphragm for measuring differential pressure between said first and second ports; and
second sensing means at said second diaphragm for measuring differential pressure between said first pressure chamber and the other of said second and third pressure chambers.

25. A transducer as claimed in claim 24, including:
a pitot-static tube combination having a pitot tube connected to said first pressure port and a static tube connected to said second pressure port.

26. A differential pressure transducer comprising in combination:
means providing first, second and third pressure chambers including a reduced-thickness first pressure sensitive diaphragm for said second pressure chamber, and a reduced-thickness second pressure-sensitive diaphragm for said third pressure chamber, with said first and second diaphragms being located between said first pressure chamber and said second and third pressure chambers, respectively;
said first and second sensing means are of a semiconductor type;
a first pressure port communicating with one of said second and third pressure chambers;
a second pressure port communicating with said first pressure chamber;
first sensing means at said first diaphragm for measuring differential pressure between said first and second ports; and
second sensing means at said second diaphragm for measuring differential pressure between said first pressure chamber and the other of said second and third pressure chambers.

27. A transducer as claimed in claim 26 including:
a pitot-static tube combination having a pitot tube connected to said first pressure port and a static tube connected to said second pressure port.

28. In a differential pressure measurement method using first and second pressure-sensitive diaphragms with first and second sensing means for measuring differentials between first and second pressures and differentials between said first and a third pressure, different from said first and second pressures, the improvement comprising in combination the steps of:
providing said first and second diaphragms in one chip;
providing a pressure chamber with the aid of said first and second diaphragms by providing said pressure chamber on one side of said chip spanning said first and second diaphragms;
providing second and third pressure chambers at said first and second diaphragms for said second and third pressures, respectively;
applying said first pressures to said pressure chamber; and
applying said second and third pressures to said first and second pressure-sensitive diaphragms, respectively, outside of said pressure chamber.

29. In a differential pressure measurement method using first and second pressure-sensitive diaphragms with first and second sensing means for measuring differentials between first and second pressures and differentials between said first and a third pressure, different from said first and second pressures, the improvement comprising in combination the steps of:
providing said first and second diaphragms in first and second chips, respectively;
providing a pressure chamber between said first and second diaphragms with the aid of said first and second chips;
providing second and third pressure chambers for said second and third pressures, respectively, outside of said second and third diaphragms;
applying said first pressure to said pressure chamber; and
applying said second and third pressures to said first and second pressure-sensitive diaphragms, respectively, outside of said pressure chamber.

* * * * *